(12) United States Patent
Le Metayer et al.

(10) Patent No.: US 7,467,376 B2
(45) Date of Patent: Dec. 16, 2008

(54) SEMANTIC ANALYSIS BASED COMPRESSION OF INTERPRETED CODE BY REPLACING OBJECT INSTRUCTION GROUPS WITH SPECIAL INSTRUCTION SPECIFYING A REGISTER REPRESENTING THE OBJECT

(75) Inventors: Daniel Le Metayer, Le Chesnay (FR); Renaud Marlet, Paris (FR); Arnaud Venet, Paris (FR); Alexandre Frey, Paris (FR)

(73) Assignee: Trusted Logic, Versailles (FR)

( * ) Notice: Subject to any disclaimer, the term of this patent is extended or adjusted under 35 U.S.C. 154(b) by 460 days.

(21) Appl. No.: 10/484,849

(22) PCT Filed: Jul. 22, 2002

(86) PCT No.: PCT/FR02/02607

§ 371 (c)(1),
(2), (4) Date: Jan. 26, 2004

(87) PCT Pub. No.: WO03/010666

PCT Pub. Date: Feb. 6, 2003

(65) Prior Publication Data

US 2004/0221282 A1    Nov. 4, 2004

(30) Foreign Application Priority Data

Jul. 26, 2001    (FR) .................. 01 10210

(51) Int. Cl.
*G06F 9/45* (2006.01)
(52) U.S. Cl. ............. 717/143; 712/227; 717/139
(58) Field of Classification Search ............. None
See application file for complete search history.

(56) References Cited

U.S. PATENT DOCUMENTS

| 5,613,121 A | 3/1997 | Blainey ............ 717/151 |
| 5,794,044 A * | 8/1998 | Yellin ............ 717/139 |
| 2002/0038454 A1* | 3/2002 | Trux ............ 717/159 |

FOREIGN PATENT DOCUMENTS

EP    0 778 521 A    6/1997

\* cited by examiner

*Primary Examiner*—Kenneth S Kim
(74) *Attorney, Agent, or Firm*—Browdy and Neimark, PLLC

(57) ABSTRACT

The invention concerns a method for compressing program code for execution in a system with few physical resources. This method comprises a semantic analysis of the code as to identify the objects accessed at each program point and to replace in this program groups of instructions used to access the objects by more compact specialised instructions.

5 Claims, 1 Drawing Sheet

Fig. 2    Methods execution environment

SEMANTIC ANALYSIS BASED COMPRESSION OF INTERPRETED CODE BY REPLACING OBJECT INSTRUCTION GROUPS WITH SPECIAL INSTRUCTION SPECIFYING A REGISTER REPRESENTING THE OBJECT

BACKGROUND OF THE INVENTION

1. Field of the Invention

This present invention concerns a method for the compression of intermediate object code by semantic analysis, usable in particular, but not exclusively, for the compacting of programs in executable intermediate object code in an embedded system with scarce hardware resources, such as a smartcard or such as a payment terminal with a microprocessor and a hardware and software environment which includes the following in particular:
- a compiler which is used to obtain the intermediate object code from a source program, and
- an interpreter which effects a software interpretation of the standard instructions of the intermediate object code into instructions which are executable directly by the microprocessor.

2. Description of the Prior Art

In general, it is known that, in contrast to syntactic analysis, semantic analysis is a set of techniques which are used to extract the properties concerning the execution of a program. This technique, which depends on well-known theoretical foundations [CC77] "Patrick Cousot & Radhia Cousot. Abstract interpretation: a unified lattice model for static analysis of programs by construction or interpretation of fixpoints. In *Conference Record of the Fourth Annual ACM SIGPLAN-SIGACT Symposium on Principles of Programming Languages*, pages 238-252, Los Angeles, Calif., 1977. ACM Press, New York, N.Y., USA", consists of constructing a mathematical model of program execution in the form of equations, known as semantic equations, and to apply algorithms for the automatic solution of these equations, enabling the desired information to be extracted. The semantic analysis techniques can, for example, be used to calculate the variation intervals of the scalar variables of a program, information which is useful for verification purposes in order to predict errors concerning crossing the boundaries of tables. They can also be used to deduce the referenced objects (accessed or modified) at given program points.

Syntactic analysis, for its part, is a test of techniques which are used to extract properties concerning the syntax of a program. The syntactic analysis techniques allows us, for example, to detect repetitions of given instruction sequences in a program. Contrary to semantic analysis, syntactic analyses are not dependent on program execution models, and do not provide information of an operational nature.

It turns out that, at the present time, all of the existing techniques in the area of code compression are based upon syntactic analysis, where the object code is treated as raw data to be compressed, but the semantics of the program (or its execution model) do not enter into the compression method. Some of these methods, such as that described in patent FR 2 785 695, for example, are based upon the search for syntactic patterns in the code, and on a factorisation of these patterns.

OBJECT OF THE INVENTION

On the contrary, the invention proposes to perform compression by making use of semantic information in order to modify the intermediate object code of the program, and to eliminate those instructions of the intermediate code which have become useless because of this modification.

SUMMARY OF THE INVENTION

More particularly, the method according to the invention consists of identifying the accesses to objects handled by the program, by a semantic analysis of the object code of the program, and using this information in order to replace, in the program code, the instruction groups accessing these objects by specialised instructions permitting direct access to the objects concerned. The reduction in the size of the code comes from the replacement of an instruction group by a specialised group of smaller size and/or by eliminating from the code those instructions which have become useless due to the introduction of the aforementioned specialised instructions.

The specialised instructions employed for this method must be incorporated into the interpreter of the language, if it does not have these.

According to the method according to the invention, the compression of executable object code programs by an interpreter can be broken down into two parts.

Firstly, if it does not already have it, the interpreter is extended with special registers and specialised versions of certain instructions of the interpreter which operate implicitly on these special registers rather than on their ordinary arguments (including instructions for the simple reading and writing of objects).

Secondly, given an interpreter possessing special registers and specialised versions of certain instructions of the interpreter which operate implicitly on these special registers rather than on their ordinary arguments (including instructions for the simple reading and writing of objects), the method for compression of an executable object code program is described by the following steps:
- a first step in which a semantic analysis of the program is performed, which highlights the objects accessed at each point of the program,
- a second step in which, using information which has been computed by semantic analysis of the first step, for any object handled by the program, one identifies the occurrences of the various instruction groups in the program which operate on this object (that is which read and convert it where appropriate) and of which one has a specialised version (that is a semantic equivalent) in terms of a special register in the instruction set of the interpreter,
- a third step in which the said objects are submitted to a superiority comparison test of a function of at least the number of occurrences of the corresponding instruction groups in the said program (as determined in the second step) to a reference value, and on a positive result to the said test, for each object satisfying the said test step,
- a fourth step in which, at a point of the preceding program, in all of the possible executions of the program, the occurrences of the instruction groups associated with the said object, one introduces the code corresponding to the attribution of the said object in one of the special registers of the interpreter,
- a fifth step in which one replaces in the program the instruction groups at each of the said occurrences by the specialised instruction in relation to the said register which corresponds to them,
- a sixth step in which one eliminates from the program code the instructions and the constructions which are rendered useless or redundant because of the program transformations indicated in the fourth and fifth steps.

The size of the program thus transformed is less than that of the initial program, this property being guaranteed by the choice method used in the third step.

BRIEF DESCRIPTION OF THE DRAWINGS

One method of implementation of the method according to the invention on JavaCard programs intended for smartcards will be described below, as a non-exhaustive examples, with references to the appended drawings in which:

FIG. 2 is a schematic representation showing the state of the JCVM interpreter just before execution of the sendBytes call in the setBalance method.

DESCRIPTION OF THE PREFERRED EMBODIMENTS

Figure 1:
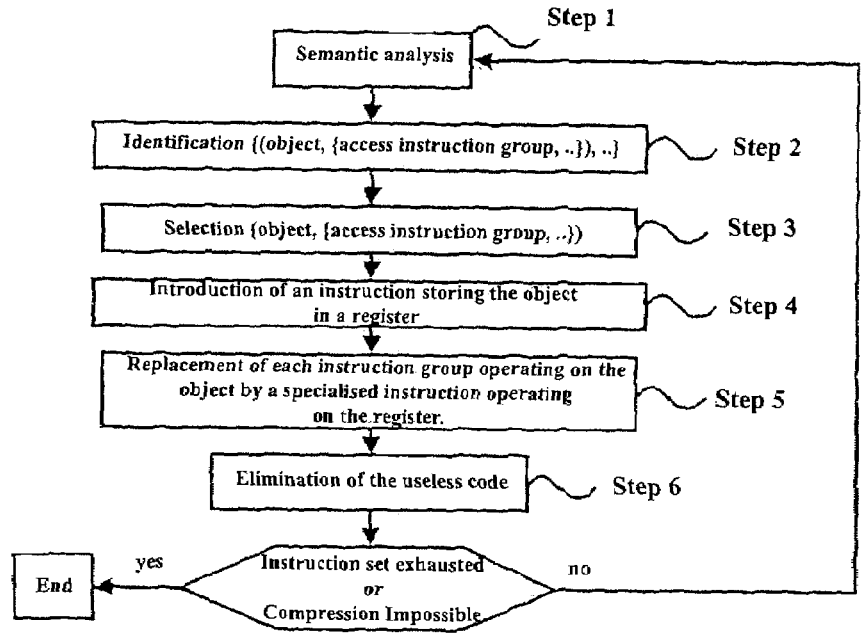
FIG. 1 is a flow diagram of the compression method according to the invention.
Figure 1:
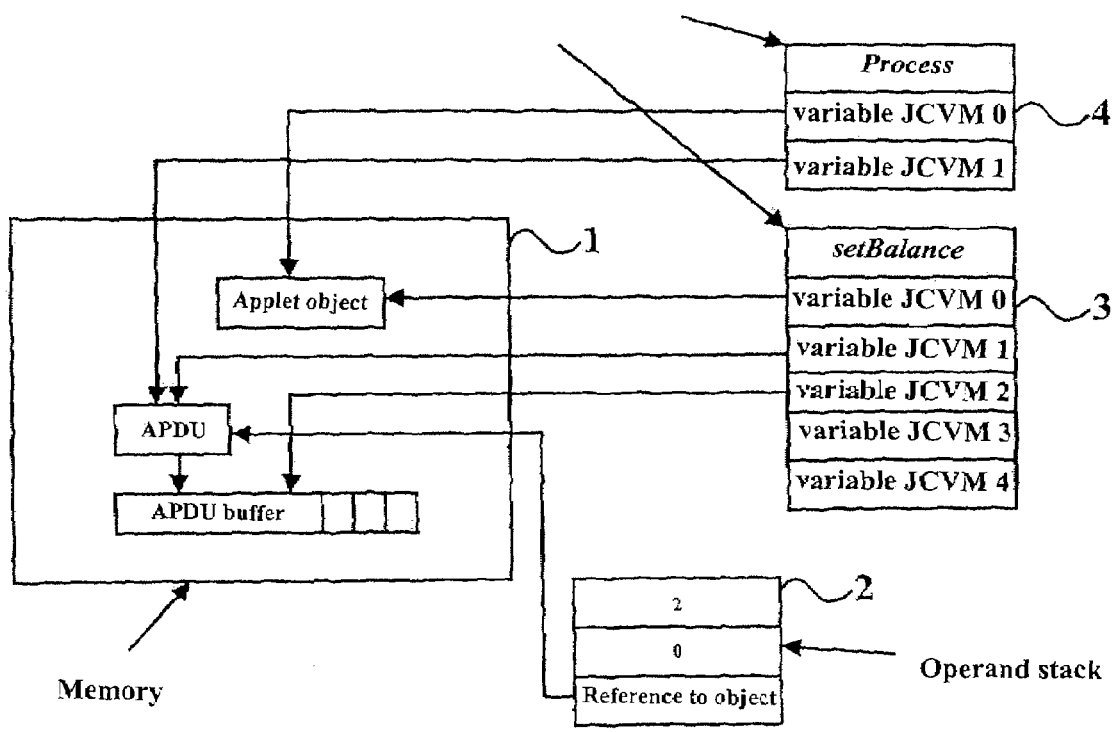

To begin with, it is useful to note that JavaCard is a complete software architecture (including a high-level object-oriented programming language, an interpreted object code, an object code interpreter of the stack-machine type, an execution environment, standard libraries, and a secure interaction system between applets accommodated on a given card) for the execution of programs on smartcards in a multiple-application context. This language is implemented using a virtual machine which interprets a program in object code (the JavaCard bytecode) in a secure environment. A JavaCard program is called an applet. This is a passive responsive program which interacts with the terminal to which the card is connected in the form of messages of the command-response type, the commands being emitted by the terminal only, with the applet returning a response for each command received. A smartcard can contain different applets capable of interacting. The applets can be introduced into a card in the factory during the mass production method, or can be downloaded during use by the holder of the card.

The intermediate object code language considered here is the JavaCard bytecode. The bytecode interpreter is the JavaCard virtual machine (JCVM) which is installed in the smartcard. The objects handled by an applet are either the JavaCard objects created by the applet itself, or objects created by the execution environment or returned by the methods of the API (Application Programming Interface). The API defines the user interface of a given library (in this document, it is the software interface to the Javacard execution environment). It contains the definition of the abstract-type libraries, their functions, and their method of use. For their part, the preliminary semantic analyses, used to determine the accesses to objects, fall into the conventional framework of pointer analyses or Alias analyses [De95] "Semantic models and Abstract Interpretation Techniques for Indicative Data Structures and Pointers, Alain Deutsch, PEPM95—Proc. ACM SIGPLAN Symposium on Partial Evaluation and semantics-based program manipulation, Jun. 21-23, 1995, La Jolla, Calif., USA". Pointer analysis is a semantic analysis which describes changes in the memory during the execution of a program. At each instruction of the program, this type of analysis calculates all of the objects which can be referenced by each variable of the pointer type and/or all of the variables of the pointer type which reference the same object (two pointers which reference the same object are called aliases). In all of this section, we will consider a simplified syntax of the JavaCard bytecode in order to facilitate the reading method, though this does not invalidate the description in any way whatsoever.

In this example, the communication protocol between the smartcard and the terminal accommodating it, is based on a standardised format [ISO7816] "ISO/IEC 7816, First Edition, 1995 Aug. 1, *Information Technology—Identification Cards—Integrated Circuit Cards with Contacts*" of data packets—the APDUs. The command sent by the terminal, as well as the responses of the applet, are encoded in the APDUs. In order to control this, the JavaCard execution (runtime) environment (JCRE) places at the disposal of programmers an APDU data type as well as a unique object of this type which is created by the environment itself, and which is used by the applet both to read the commands emitted by the terminal and to write the response data. The data of the APDU object are stored in a buffer which is associated with it. Each applet necessarily possesses a process method which takes this APDU type object as an argument, one method being the name of a sub-program attached to a data type for which it defines a function. At the start of execution of the process method, this object contains the command emitted by the terminal, and at the end of execution of the method, it contains the response returned by the applet.

As illustrated by the flow diagram shown in FIG. 1, the first step of the flow diagram consists of a semantic analysis which includes an interprocedural propagation of the references to the APDU object, and to its associated buffer, that is an analysis which can be used to identify the references to the instance of the APDU class contained in the JCRE execution environment, and its associated unique buffer in all the methods of the applet. The source of the APDU object is the unique argument of the process method of the APDU object. It is this value that is propagated throughout all of the program, exploring the call graph of the program from process.

This first step also includes identification of the references to the buffer of the APDU by the calls of the getBuffer method of the APDU class to a reference to the APDU object of the JCRE.

Step 2 identifies the instruction groups which read or transform either of these two objects (APDU and buffer), the buffer being accessible only by means of the APDU.

In fact, the analysis determines, at each point of the JavaCard bytecode of the APDU object, which are the local variables and the entries into the stack that contain a reference to the APDU or to its buffer. Different optimisations are then possible based on this information (choice of the object and of the APDU buffer at step 3 of the flow diagram).

By using two registers of the interpreter, it is possible to gain direct access to the APDU or to the buffer of the APDU. To this end, it is necessary to insert the initialisation operations of these registers into the code of the applet, at the start of the process method for example (step 4 of the introduction of an instruction storing the object in a register). A style currently used in the JavaCard applets is to pass a reference to these two objects to the internal methods of the applet called by process. Compression then consists (step 5) of replacing, in these methods, the reading of the local variables (that is the parameters of the method) containing these objects, and the operations which follow them, by the corresponding specialised operations (referring to these two registers). It is also possible to eliminate these two arguments from the definition of the method, as they are no longer used (step 6 of elimination of the useless code). The saving in space is then achieved not only by the use of specialised (more compact) instructions but also by the elimination of instructions for the stacking of these instructions during each call to the methods concerned, which then become useless.

The steps of the method described previously will be illustrated below by some examples, namely:
- an example of the compression of operations on the object and the APDU buffer in a banking application of the electronic purse type (example 1),
- an extension of the preceding example in the case of GSM applications (the "Global Positioning System for Mobile Communications" mobile radio-telephone system with digital transmission) (example 2).
- an example of the compression of access paths to the objects created by the applet (example 3).
- an example of the compression of calls to internal methods of the applet (Example 4).

These examples employ the following technical terms. In the glossary below, the definitions of these terms take account of their context:

Bytecode: a term which is synonymous with the interpreted object code. Here, this term refers to the interpreted object code subjacent to the JavaCard virtual machine.

Access path: a sequence of operations for field selection in structured data which is used to reference an object of the program which is not accessible directly from a variable.

Class: in an object-oriented language, a class is the definition of a type of data and the methods associated with it.

EEPROM: non-volatile, rewriteable memory, installed in a smartcard. The non-volatile objects created by a JavaCard applet are stored in this memory.

JavaCard: a programming language and environment designed by Sun Microsystems for the execution of programs in smartcards.

JCRE: an acronym of the Javacard Runtime Environment. This is the execution environment of the JavaCard architecture which is installed in a smartcard.

This environment contains the bytecode interpreter (the JCVM), the standard libraries, the data exchange protocol between the card and the terminal, and the system responsible for security during the transactions between the applets (firewall).

JCVM: an acronym of JavaCard Virtual Machine. Name of the JavaCard code interpreter (bytecode). This interpreter is a component of the JCRE.

Object: a memory area containing a structure which is defined by a type of data in the program.

EXAMPLE 1

In this example, it is assumed that:
a) the process method of the applet has the following conventional form in JavaCard:

```
public void process (APDU apdu) {
byte[ ] buffer = apdu.getBuffer( );
...
switch (buffer [ISO7816.OFFSET_INS]) {
    case SET_BALANCE: {
        setBalance (apdu, buffer);
        return;
    }
    case ...
}
...
}
``` and that,
b) the setBalance method which modifies the balance of the purse to the following form:

```
private void setBalance (APDU apdu, byte[ ] buffer) {
    short currency = buffer [OFFSET_CURRENCY];
    short amount = Util.getShort (buffer,
OFFSET_AMOUNT);
    ...
    apdu.sendBytes ((short)0, (short)2); // new balance
}
```

The process method decodes the command stored in the buffer of the APDU object and, depending on the code of the command (provided in particular by the byte located at index ISO7816.OFFSET INS of the APDU buffer), calls different internal methods which are charged to deal with each command. These internal methods receive both the APDU object and its buffer as argument, so as to be able to read the parameters of the command and to write the response. This setBalance method has not been detailed in its entirety, and only those few lines have been reproduced which read the type of currency from the buffer (at index OFFSET_CURRENCY) and the amount to be credited to the electronic purse (at index OFFSET_AMOUNT).

After compilation of the applet into bytecode, the process method typically has the following form (comments are preceded by the "//" symbol).

aload 1
invokevirtual "getBuffer( )"
astore 2
...
aload 2
sconst 1//ISO7816.OFFSET_INS
baload
switch ...
...
aload 0
aload 1
aload 2
invokespecial "setBalance(APDU, byte[ ])"
return
...

After compilation into bytecode, the setBalance method has the following form:
aload 2
sconst OFFSET_CURRENCY
baload
sstore 3
aload 2
sconst OFFSET_AMOUNT
invokestatic "Util.getShort(byte[ ], short)"
sstore 4
...
aload 1
sconst 2
sconst 0
invokevirtual "sendBytes(short, short)"
return The JavaCard virtual machine uses a stack to store the arguments and the results of the calculations as well as the JCVM numbered variables, enabling both storage of the arguments of the methods and storage of the results whose lifetime is greater than that of the stack. Each variable in the JavaCard program (local variable or argument) is translated as a JCVM variable in the bytecode.

In the process method, the apdu parameter is stored in JCVM variable 1, the JavaCard buffer in JCVM variable 2, and the reference to the applet object in JCVM variable 0. In the setBalance method, the apdu parameter is stored in JCVM variable 1, the buffer parameter in JCVM variable 2, the JavaCard currency variable in JCVM variable 3, the JavaCard amount variable in JCVM variable 4, and the reference to the applet object in JCVM variable 0.

The aload n instruction stacks the value of JCVM variable n, the astore n instruction writes to JCVM variable n the value of the object type located at the top of the operand stack, the sstore n instruction writes to JCVM variable n the value of the integer type located at the top of the stack, the sconst c instruction stacks the constant c, the invokevirtual and invokespecial instructions represent the method calls according to various modes not detailed here, the baload instruction is the read instruction of a table element, the switch and return instructions represent the multiple choice and the method return respectively. All the instructions of the JavaCard bytecode take their arguments from the operand stack.

FIG. 2 is a schematic representation showing the state of the JCVM interpreter just before execution of the sendBytes call in the setBalance method.

According to this representation:
- block 1 represents the memory allocated to the interpreter, which here includes the applet object which corresponds to the program being executed, the APDU object, and the buffer associated with the APDU.
- block 2 is the operand stack,
- block 3 represents JCVM variables 0 to 4 used by the setBalance method, and
- block 4 shows JCVM variables 0 and 1 used by the process method.

The operand stack (block 2) contains three values. From the bottom of the stack, these are a reference to the APDU object, integer 2 and integer 0.

Each method call generates an execution environment which defines the JCVM variables used by the method.

Whether for the operand stack or for the method execution environment, the references to the objects located in memory are represented by arrows.

In the event that the preliminary semantic analysis (step 1 of the method) has determined that, at any point of the setBalance method, the variable JCVM 1 contained a reference to the APDU, and JCVM variable 2 a reference to the buffer of the APDU, step 2 then determines, in particular, from the instructions mentioned above, the occurrences of the instruction group that is operating on the object and the APDU buffer. In the event that these two objects are chosen at step 3, then, depending on the remainder of the method, these objects will be stored in two registers of the interpreter, denoted 4 and B. The instructions which perform reading of the corresponding registers are denoted aload_A and aload_B. Likewise, the instructions which assign to these same registers a reference stored on the operand stack are denoted astore_A and astore_B.

According to step 4 of the method, the bytecode sequence which initialises global registers A and B is inserted at the beginning of the method process. The start of the process method then becomes:
 aload 1
 astore_A
 aload 1
 invokevirtual "getBuffer( )"
 astore 2
 aload 2
 astore_B According to step 5 of the method, the occurrences of the instruction groups accessing the object and the APDU buffer are replaced by the corresponding specialised read instructions, both in process:
 aload_B
 sconst 1//ISO7816.OFFSET_INS
 baload
 switch . . .
 . . .
 aload 0
 aload_A
 aload_B
 invokespecial "setBalance(APDU, byte[ ])"
 return
 . . .
and in setBalance
 aload_B
 sconst OFFSET_CURRENCY
 baload
 sstore 3
 aload_B
 sconst OFFSET_AMOUNT
 invokestatic "Util.getShort(byte[ ], short)"
 sstore 4
 . . .
 aload_A
 sconst 2
 sconst 0
 invokevirtual "sendBytes(short, short)"
 return Finally, according to step 6 of the method, the program is simplified by the elimination from the setBalance method of arguments which are now useless. The call to this method in process then becomes:
 aload 0
 invokespecial "setBalance( )"
 return
 . . .
and the signature of the setBalance method is modified by deletion of its arguments.

A size advantage is achieved due to elimination of the argument stacking instructions of the setBalance method at the moment of its call.

Specialisation of Operations on the Tables

The instructions for handling of the bastore tables (writing of an element) and the baload tables (reading of an element) are frequently used to access the buffer of the APDU. Creating special instructions which directly handle the buffer stored in a register allows one to eliminate the operation of stacking the reference to this buffer before each bastore/baload.

Thus if, in step 3 of the method, account is also taken of table reading in the setBalance method among the instruction groups operating on the buffer of the APDU, then step 5 rewrites setBalance in the following manner:
 sconst OFFSET_CURRENCY
 baload_B
 sstore 3

The instruction to read an element from the table has been specialised in the baload_B instruction, which reads its argument from the B register, and so the stacking of the APDU buffer has been avoided.

Specialisation on the API Virtual Calls Object

A virtual call consists of calling a method on an object for which it defines a function.

Certain methods of the API, such as javacard.framework.APDU.sendBytes (transmission of data to the terminal to which the card is connected) are always called on the APDU object. It is possible to employ a specialised instruction to make such calls, and thus to avoid stacking of the reference to the APDU be fore calling the virtual method.

Thus, if in step 3 of the method, account is also taken of the virtual call to sendBytes in the setBalance method among the instruction groups operating on the APDU object, then step 5 rewrites setBalance as follows:
  sconst 2
  sconst 0
  invokevirtual_A "sendBytes(short, short)"
  return The virtual method call instruction has been specialised in the invokevirtual_A instruction, which will read the object on which the method is called in the A register, and so stacking of the APDU object is avoided.

Specialisation on the API Call Arguments

Certain methods of the API, such as javacard.framework.Util.getShort (reading of a 16-bit integer from a bytes table) or javacard.framework.Util.arrayCopy (copying a bytes table) are often used with the buffer of the APDU as argument. It is possible to create specialised instructions which avoid stacking the reference to the buffer for the corresponding argument.

Thus if, in step 3 of the method, account is also taken of the call to getShort in the setBalance method among the instruction groups operating on the APDU buffer, then step 5 re-writes setBalance in the following manner:
  sconst OFFSET_AMOUNT
  invokestatic_B "Util.getShort(byte[ ], short)"
  sstore 4

The static method call instruction has been specialised in instruction invokestatic_B, which reads its first argument from register B, and so stacking of the APDU buffer is avoided.

EXAMPLE 2

The GSM applications do not use the conventional APDU exchange protocol, but rather an API of higher level which takes charge of the different APDU exchanges. This API is based on four classes which represent the various types of message that the card can exchange with the terminal (a mobile telephone in this case):
  EnvelopeHandler
  EnvelopeResponseHandler
  ProactiveHandler
  ProactiveResponseHandler These data types are used in the same way as the APDU type to exchange data between the terminal and the card. There exists only one instance of each of these classes, which is constructed and controlled by the API. A reference to these instances can be obtained using the getTheHandler method which is implanted by each of these classes. All of the compression techniques described in the previous section for the APDU and its compression buffer can therefore transpose themselves directly in the context of the GSM applications. In the same way, semantic analysis is a propagation of interprocedural references which takes responsibility for identifying the references to these different objects in all of the applet code.

EXAMPLE 3

Compression of the Access Paths to the Objects Created by the Applet

Typically, an applet can create objects in EEPROM at the moment of its installation on the card, and can store these in the variables of the applet. Semantic analysis is used to associate, with each group of bytecodes which access an object, which is the object accessed each time that it can do so (this depends on the power and accuracy of the semantic analysis employed). When the analysis allows the accessed object to be determined, it is possible to replace the operations group used to access it by a single operation. To this end, it is possible to use a register in which a reference to the object is stored, and to replace the bytecodes group by an operation to read this register.

This method requires determination of a position in the body of the applet at which to insert the initialisation operation of the register at the object in question in its different contexts of use. This position must satisfy two constraints—it must precede any access to the value of the objects concerned and it must not itself precede any modification to the value of the object. It therefore involves a position in the program where the object has acquired its definitive value (a value which will remain constant until the end of the program) and where it has not yet been accessed. The calculation of such positions in the program makes use of standard static analysis techniques.

As an example, we consider the case of the install method which is called once only in the lifetime of each applet, at the moment of its creation on the card. This method takes responsibility for putting in place all of the data that is going to be used by the applet. In general, all of the objects handled by the applet are created in this method. We place ourselves in such a case, and assume that semantic analysis enables us to determine the access paths to the objects obtained from the variables of the applet which are no longer modifiable after execution of the install method. In such a case, it is permissible to store the values of these paths in registers, by inserting the appropriate operations at the beginning of the process method.

This gives the following JavaCard fragment:
  this.f.array[0]=1;
  this.f.array[1]=2;

After compilation, the corresponding bytecode is of the following form:
  getfield_this "f"
  getfield "array"
  sconst 0
  sconst 1
  sastore
  getfield_this "f"
  getfield "array"
  sconst 1
  sconst 2
  sastore The getfield and getfield_this instructions stack the object field value (field of the current applet object for getfield_this) and the sastore instruction writes an integer into a table.

If the semantic analysis has allowed us to determine that the object referenced by this.f.array is determined uniquely after installation of the applet, and if it is stored in the A register, then again using the notations of example 1, the code obtained after compacting has the following form (using the notations of example 1):
  aload_A
  sconst 0
  sconst 1
  sastore
  aload_A
  sconst 1
  sconst 2
  sastore It is also necessary to insert, at the appropriate place (at the start of the process method, for example), the following initialisation sequence:
   getfield_this "f"
   getfield "array"
   astore_A It should be noted that this space optimisation is also an optimisation of calculation time, since there is less accessing of the memory in the compacted form of the bytecode.

EXAMPLE 4

In general we also find, in the body of the applet, many calls to the internal methods of the applet. The method calls (using the invokespecial operation) require stacking of the references to the applet object by means of the aload 0 instruction (in JavaCard, the reference to the applet is always, by convention, stored in variable 0 of each applet method). The proposed compacting method concerns the internal methods of the applet which are not accessible directly or indirectly from another applet. In fact, in a multiple-application context, a method which can be used from another context (another applet in this case) cannot undergo modifications which incorporate specificities of the context of the applet which has defined it.

The compacting system then operates as follows:

We use an A register to register the referenced to the applet object.

In each of the candidate methods, we replace each aload 0 operation which makes referenced to the applet by an operation to read the A register.

In all the other methods of the applet, we identify the bytecode groups which correspond to a call to one of the methods thus transformed.

In each one of these groupe:

a) We eliminate the aload 0 instruction which corresponds to stacking of the reference to the current applet object.

b) We replace the invokespecial instruction by a new invokespecial_applet instruction which has the same semantics, the only difference being that the referenced to the applet object is read from register A and not from the stack.

We insert an initialisation operation of the A register in the code of the applet, at the beginning of the process method for example.

The following bytecode group corresponds to an internal method call:
   aload 0
   aload 2
   sconst 23
   invokespecial "privateMethod(byte[ ], short)"

If the privateMethod satisfies the conditions required for compression, then, after compression, this bytecode group becomes:
   aload 2
   sconst 23
   invokespecial_applet "privateMethod(byte[ ], short)"

... given that, in the privateMethod method, all of the aload 0 instructions have been replaced by instructions to read the aload_A registers (using the notations of example 1), and that the following bytecode sequence is inserted at the beginning of the process method:
   aload 0
   astore_A

The invention claimed is:

1. A method for compressing a program code which comprises a plurality of code instructions to be executed by an interpreter, some of the said instructions handling objects, each object possessing a value, said method comprising:
   a first step in which a semantic analysis of the program code is performed, which returns a list of objects accessed at each point of the program code,
   a second step of identifying by means of information which has been computed by semantic analysis in the first step, for any object handled by the program code, occurrences of various instruction groups in the program code which operate on this object and for which a specific register is made available in an instruction set of the interpreter,
   a third step in which number of occurrences of each of the said objects is compared to a threshold value, and for each object such that this number of occurrences is greater than this threshold value,
   a fourth step in which, at a program point which in each possible execution of the program code, precedes execution of one occurrence of instruction groups associated with the said object, one introduces a code performing an assignment of a value of said object to one of the special registers of the interpreter,
   a fifth step in which one replaces the instruction groups at each occurrence in the program code by specialized instructions in relation to the said register corresponding to them,
   a sixth step in which one eliminates from the program code instructions and the constructions which have become useless or redundant after the fifth step.

2. A method according to claim 1 wherein said replacement consists of replacing, in internal methods of the Java Card program code, read operations on local variables containing said objects and subsequent operations by said specialized instructions.

3. A method for compressing a Java Card program code containing a reference to an Application Protocol Data Unit APDU object possessing a reference and initially stored in an Application Protocol Data Unit APDU Buffer, said Java Card program code comprising a plurality of code instructions to be executed by an interpreter, which comprises two registers to access to said APDU object or said APDU Buffer directly, by inserting initialisation operations of said registers into the Java Card program code, said method comprising:
   a first step of identifying with identifying information the code instructions which access to said APDU objects by a semantic analysis of said Java Card program code, said semantics analysis consisting in constructing a mathematical model of the program code in the form of semantic equations propagating the reference to said APDU object through said Java Card program code and applying algorithms for automatically solving these equations to extract said identification information,
   a second step of replacing in said Java Card program code at least one group of code instructions accessing said APDU object or APDU buffer by one single special instruction to access by means of information stored in said registers to said APDU object or said APDU buffer.

4. A method according to claim 3, wherein the said special instruction is incorporated into an instruction set of said interpreter.

5. A method according to claim 4, wherein the said interpreter is extended with special registers and specialized versions of certain instructions of the interpreter which operate implicitly on said special registers rather than on their ordinary arguments.

* * * * *